United States Patent [19]

Yuji et al.

[11] 4,439,976

[45] Apr. 3, 1984

[54] METHOD FOR FILLING GAS INTO A METAL CONTAINER

[75] Inventors: Soeda Yuji; Akio Goto, both of Kanagawa, Japan

[73] Assignee: Tokico Ltd., Kanagawa, Japan

[21] Appl. No.: 413,433

[22] Filed: Aug. 31, 1982

Related U.S. Application Data

[62] Division of Ser. No. 148,490, May 9, 1980, Pat. No. 4,361,248.

[30] Foreign Application Priority Data

May 21, 1979 [JP] Japan .................................. 54-62515

[51] Int. Cl.³ .............................................. B65B 31/04
[52] U.S. Cl. ...................................... 53/403; 53/489; 53/97
[58] Field of Search ................. 53/403, 404, 487, 489, 53/83, 405, 432, 88, 97; 220/3, 254, 256

[56] References Cited

U.S. PATENT DOCUMENTS

| | | | |
|---|---|---|---|
| 1,753,871 | 4/1930 | Schworetzky | 220/3 |
| 2,198,752 | 4/1940 | Barr | 53/489 |
| 3,081,587 | 3/1963 | Heckethorn | 53/404 |
| 3,247,640 | 9/1966 | DeWayne | 53/404 |
| 4,262,472 | 4/1981 | Soeda | 53/403 |

FOREIGN PATENT DOCUMENTS

| | | | |
|---|---|---|---|
| 144618 | 1/1952 | Australia | 53/404 |
| 1303608 | 8/1962 | France | 53/489 |

*Primary Examiner*—John Sipos
*Attorney, Agent, or Firm*—Wenderoth, Lind & Ponack

[57] ABSTRACT

A metal container is deformed to have a sheared portion in a part of the wall thereof, a projecting portion formed adjacent to the sheared portion and outwardly projecting from the wall of the container, the projecting portion having a fractured side surface and the dimension of the projecting portion in a direction transverse to the side surface increasing in a direction outwardly of the container. A gas introducing passage thereby is formed to extend along the sheared portion and the fractured side surface and through the wall of the container.

4 Claims, 9 Drawing Figures

METHOD FOR FILLING GAS INTO A METAL CONTAINER

This is a division of Ser. No. 148,490 filed May 9, 1980 now U.S. Pat. No. 4,361,248.

BACKGROUND OF THE INVENTION

This invention relates to a method for filling gas into a metal container such as an oleo-pneumatic shock absorber or a gas spring.

One prior art method for filling high pressure gas into a metal container consists of forming a small hole in an end wall of the container, filling gas into the container through the small hole, closing the hole by inserting therein a plug and welding the plug to the container. In such case, difficulties are encountered in that it is necessary to remove burrs or the like from the inner edge of the small hole, thereby decreasing the working efficiency, that it is necessary to fabricate the plug separately from the container, thereby increasing the cost for the machining operation, and that it is necessary to control the material of the plug carefully since the plug is formed separately from the container.

SUMMARY OF THE INVENTION

An object of the present invention is to overcome the difficulties aforementioned by providing a novel method for filling pressurized gas into a metal container comprising the steps of forming a sheared portion in a part of the wall of the container, deforming outwardly a wall portion of the container adjacent to the sheared portion so as to form a projecting portion, which projecting portion has a fractured side surface and the dimension of which in a direction transverse to the side surface increases in a direction outwardly of the container, thereby forming a gas introducing passage extending along the sheared portion and the fractured side surface, supplying pressurized gas into the container through the gas introducing passage, deforming inwardly the projecting portion by applying thereto a pressing force, and permanently securing the inwardly deformed projecting portion to the container by a resistance welding process.

The method of the present invention results in the formation of a metal container having a sheared portion in a part of the wall thereof, a projecting portion formed adjacent to the sheared portion and outwardly projecting from the wall of the container, which projecting portion has a fractured side surface and the dimension of which in a direction transverse to the fractured side surface increases in the direction outwardly of a container, and a gas introducing passage defined by the sheared portion and the projecting portion to extend through the wall of the container. The projecting portion effectively acts as a plug for closing the gas introducing passage.

BRIEF DESCRIPTION OF THE DRAWINGS

The present invention will be explained further hereinafter, by way of example, with reference to the accompanying drawings, in which.

DETAILED DESCRIPTION OF THE PREFERRED EMBODIMENTS

Figure 1:
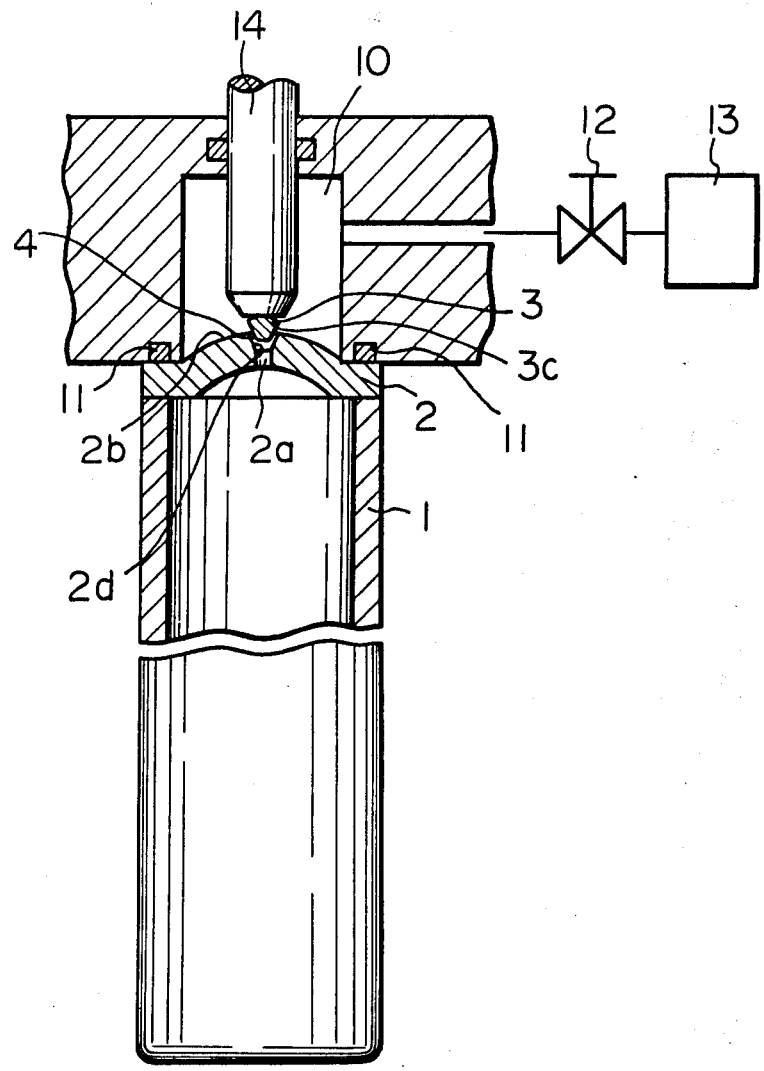
FIG. 1 is a schematic view showing a gas filling method according to the invention.
Figure 2:
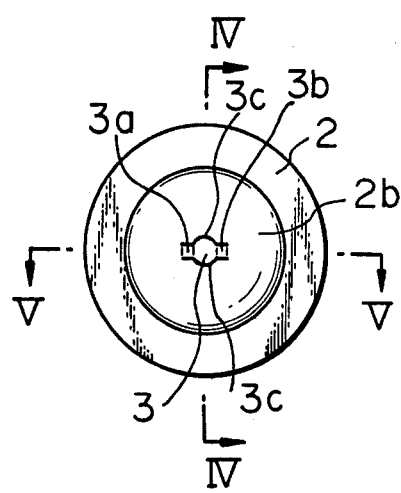
FIG. 2 is a top plan view of the end cap of the container of FIG. 1.
Figure 3:
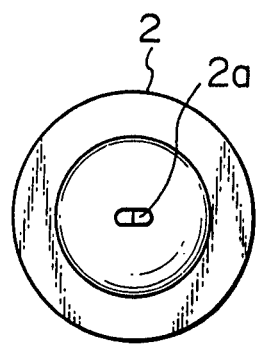
FIG. 3 is a bottom view of the end cap of FIG. 2.
Figure 4:
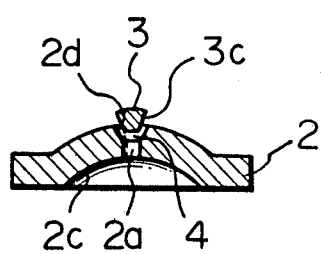
FIG. 4 is a sectional view taken along line IV—IV in FIG. 2.
Figure 5:
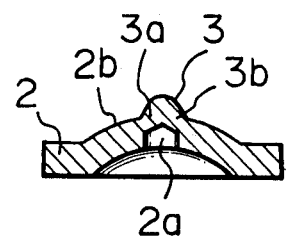
FIG. 5 is a sectional view taken along line V—V in FIG. 2.

As shown in FIGS. 1-5, a projecting portion 3 is formed on an end cap 2 of a metal container 1 according to the invention. Preferably, the metal container 1 is a housing of a shock absorber or a gas spring. A gas introducing passage 4 is formed to extend through the wall of the end cap 2. The projecting portion 3 has fractured side surfaces 3c and 3c. The dimension of portion 3 in a direction transverse to the side surfaces 3c and 3c increases in a direction outwardly of the container 1, whereby the cross-section thereof as viewed in FIG. 4 has an inverted truncated cone like shape.

Now, description will be made with reference to a die 5 and a punch 6 for forming the projecting portion 3.

Figure 6:
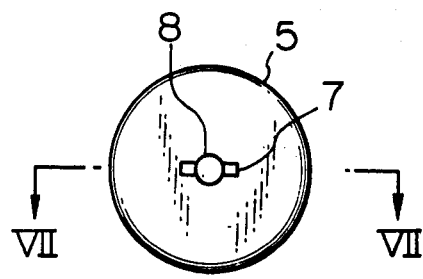
FIG. 6 is a top view of a die for forming a projecting portion according to the invention.
Figure 7:
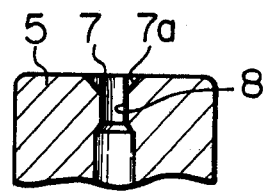
FIG. 7 is a partial sectional view taken along line VII—VII in FIG. 6.

As shown in FIGS. 6 and 7, a sidewisely extending groove 7 is formed in the upper surface of the die 5, and a circular opening 8 having the diameter larger than the width of the groove 7 is formed in the central portion of the groove 7. The bottom surface 7a of the groove 7 inclines toward the opening 8, and the groove 7 and the opening 8 are connected with one another.

Figure 8:
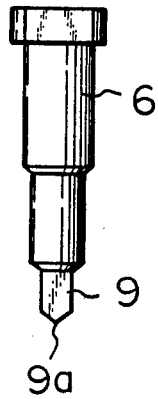
FIG. 8 is a side view of a punch.
Figure 9:
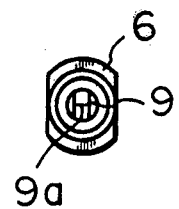
FIG. 9 is a bottom view of the punch of FIG. 8.

As shown in FIGS. 8 and 9, the tip end portion 9 of a punch 6 has a cross-section corresponding to the groove 7, with the distal end 9a having a triangular shape as viewed in FIG. 8.

The machining operation is performed as follows.

The cap 2 is mounted on the die 5 with the outer surface 2b of the cap 2 engaging with the upper surface of the die 5. The punch 6 is mounted on a punch holder of a press (not shown). A pressing force is applied on the punch 6, whereby a sheared surface 2a having a configuration corresponding to the tip end portion 9 of the punch 6 is formed in the wall of the cap 2. When the sheared surface 2a is formed by a predetermined amount, a part of the wall of the cap 2 fractures along side surfaces 3c and 3c thereby forming a projecting portion 3 which projects outwardly of the outer surface 2b of the cap 2. It will be noted that the maximum diameter of the projecting portion 3 corresponds to the inner diameter of the opening 8 of the die 5, that fractured surfaces 2d and 2d corresponding to the side surfaces 3c and 3c are formed adjacent to the sheared surface 2a, that the sheared surface 2a extends from the inner surface 2c of the cap 2 to a position approximately midway the thickness of the wall of the cap 2, and that the fractured side surfaces 3c are tapered in the direction towards the inner surface 2c of the cap 2. The gas introducing passage 4 extends along the surfaces 2a, 2d and 3c. The projecting portion 3 is connected to the cap 2 through opposite side portions 3a 3b, and the outer configuration of which is defined by the bottom of the groove 7 in the die 5. The dimension of the projecting portion in the direction transverse to the side surfaces 3c or in the horizontal direction as viewed in FIG. 4 increases in the direction outwardly of the cap 2.

The gas filling operation will now be described. The container 1 having the gas introducing passage 4 in the cap 2 as described heretofore is positioned, as shown in FIG. 1, at least partly in a closed chamber 10 with the passage 4 being exposed in the chamber 10. The chamber 10 is sealed by a seal member 11. Pressurized gas is introduced into the chamber 10 from a source of pressurized gas 13 by opening a valve 12, whereby pressurized gas introduced into the chamber 10 is supplied into the container 1 through the passage 4. After supplying a predetermined amount of pressurized gas into the container 1, an electrode 14 is moved downwardly as viewed in FIG. 1 to deform the projecting portion 3 so that the side surfaces 3c of the projecting portion 3 tightly engage with the fractured surfaces 2d of the cap 2 to close the passage 4. Thereafter, the projecting portion 3 is welded to the remaining portion of the cap 2, preferably by a resistance welding process.

As described heretofore, the gas filling method according to the present invention comprises the steps of forming a sheared portion in a part of the wall of the container, and deforming outwardly a wall portion adjacent to the sheared portion so as to form a projecting portion which has a fractured side surface and the dimension of which in the direction transverse to the fractured side surface increases in the direction outwardly of the container, whereby a gas introducing passage is formed along the sheared surface and the fractured surface. The projecting portion can effectively act as a plug for closing the gas introducing passage since the projecting portion has the cross-section tapering in the inward direction. Further, it is possible to omit the machining operation for removing burrs or the like as compared with the prior art method, and to omit any separate plug for closing the gas introducing passage.

What is claimed is:

1. A method of filling pressurized gas into a metal container, said method comprising:

deforming outwardly a portion of a wall of the metal container and thereby causing fracture of said wall along two fractured surfaces while projecting said portion outwardly from the remainder of said wall between said two fractured surfaces with said portion being integrally connected to said remainder of said wall at opposite ends of said two fractured surfaces, and thereby forming gas introducing passages between said two fractured surfaces and respective fractured side surfaces of said projecting portion, said deforming comprising the forming of said projecting portion with increasing thickness in a direction transverse to said side surfaces thereof in a direction outwardly of said container;

supplying pressurized gas into the interior of said container through said gas introducing passages;

deforming inwardly said projecting portion by applying thereto a pressing force to return said projection into the wall opening created by said outward deformation and re-engage said fractured surfaces and said respective side surfaces, thereby closing said gas introducing passages; and permanently securing the thus inwardly deformed projecting portion to said remainder of said wall.

2. A method as claimed in claim 1, wherein said securing is achieved by resistance welding.

3. A method as claimed in claim 1, wherein said securing comprises fixing said side surfaces to respective said fractured surfaces.

4. A method as claimed in claim 1, wherein said step of deforming outwardly comprises providing a punch having a tip end portion of rectangular cross section defined by opposite long sides and opposite short sides, with the distal end of said punch having a triangular shape as viewed toward one of said long sides, providing a die having a circular hole of a diameter larger than said short side and smaller than said long side and an elongated groove intersecting said circular hole and having a configuration corresponding to said rectangular cross section of said punch at the outer surface of said die, with bottom surfaces of said groove converging inwardly toward said circular groove, positioning said wall between said punch and said die with the inner surface of said wall facing said punch and the outer surface of said wall facing said die, and moving at least one of said punch and die relatively toward each other.

* * * * *